United States Patent [19]

Burger et al.

[11] Patent Number: 4,885,789

[45] Date of Patent: Dec. 5, 1989

[54] REMOTE TRUSTED PATH MECHANISM FOR TELNET

[75] Inventors: Wilhelm F. Burger, Bethesda; Mark E. Carson, Rockville; Abhai Johri, Gaithersburg, all of Md.; Ellen J. Stokes, Liberty Hill, Tex.

[73] Assignee: International Business Machines Corporation, Armonk, N.Y.

[21] Appl. No.: 150,966

[22] Filed: Feb. 1, 1988

[51] Int. Cl.[4] .............................................. H04L 9/00
[52] U.S. Cl. ...................................... 380/25; 364/200
[58] Field of Search ...................... 380/23, 25; 364/200

[56] References Cited

U.S. PATENT DOCUMENTS

| | | | |
|---|---|---|---|
| 4,677,670 | 6/1987 | Henderson Jr. | 380/25 |
| 4,701,840 | 10/1987 | Boebert et al. | 364/200 |
| 4,748,668 | 5/1988 | Shamir et al. | 380/25 |
| 4,771,461 | 9/1988 | Matyas | 380/25 |
| 4,794,664 | 12/1988 | Phillip et al. | 380/25 |
| 4,799,061 | 11/1989 | Abraham et al. | 380/23 |
| 4,799,153 | 1/1989 | Hann et al. | 364/200 |

OTHER PUBLICATIONS

T. A. Berson, et al., "KSOS-Development Methodology for a Secure Operating System," Proc. of the Natl. Comp. Conf., vol. 48, AFIPS Press, 1979, Montvale, NJ, pp. 365-372.

S. Kramer, "Linus IV-An Experiment in Computer Security," Proc. of the 1984 Symposium on Security and Privacy, Oakland, CA., Apr. 1984, pp. 24-33.

G. J. Popek, et al., "UCLA Secure Unix," Proc. of the Natl. Comp. Conf., vol. 48, AFIPS Press, 1979, Montvale, NJ, pp. 355-364.

V. D. Gligor, et al., "On the Design and Implementation of Secure Xenix Workstations," IEEE Symposium on Security, 4/86, pp. 102-117.

Primary Examiner—Salvatore Cangialosi
Attorney, Agent, or Firm—John E. Hoel

[57] ABSTRACT

In the remote trusted path invention, secure systems may provide a mechanism for the user to establish a trusted path for direct communication with the system's trusted computing base for security-critical operations. This invention allows users to request such a trusted path from remote systems using a new TELNET option and command, in a system-independent, confirmed, backward-compatible manner. It also describes how to implement remote support for such a trusted path in systems which use a Secure Attention Key mechanism such as Secure AIX.

2 Claims, 6 Drawing Sheets

CLIENT NODE

STATE DIAGRAM FOR SERVER NODE

REMOTE TRUSTED PATH MECHANISM FOR TELNET

BACKGROUND OF THE INVENTION

1. Technical Field

The invention disclosed broadly relates to data processing and more particularly relates to the establishment of a trusted path between remote portions of a data processing network.

2. Background Art

Many data processing applications involve highly confidential information such as in financial applications, national security applications, and the like where data or programs in a remote processor of a data processing system must be accessed by a user at a local processor connected to the system. The prior art has not provided an effective mechanism to prevent unauthorized persons or programs from reading data from the remote processor. In prior art data processing systems, the communication path between the local processor and the operating system software in the remote processor can either be forged or penetrated by an unauthorized program known as a Trojan horse, which can masquerade as the program in the remote processor with which the user intends to communicate, and can divert, replicate or otherwise subvert the security of the confidential information being accessed in the remote processor by the user at his local processor.

For national security applications, the U.S. Government has established a standard by which the security of data processing systems can be evaluated, that standard having been published in "Trusted Computer System Evaluation Criteria," U.S. Department of Defense, December 1985, DoD publication number 5200.28-STD (referred to herein as DoD Standard). The DoD Standard defines a trusted computer system as a system that employs sufficient hardware and software integrity measures to allow its use for processing simultaneously a range of sensitive or classified information. A trusted computing base (TCB) is defined as the totality of protection mechanisms within a computer system, including hardware, firmware and software, the combination of which is responsible for enforcing a security-policy. A TCB consists of one or more components that together enforce a unified security policy over a product or system. The ability of a TCB to correctly enforce a security policy depends solely on the mechanisms within the TCB and on the correct input by system administrative personnel of parameters such as a user's clearance, related to the security policy. A trusted path is defined by the DoD Standard as a mechanism by which a person at a terminal of a local processor can communicate directly with the trusted computing base. The trusted path mechanism can only be activated by the person or the trusted computing base and cannot be imitated by untrusted software. Trusted software is defined as the software portion of a trusted computing base.

The problem of maintaining a trusted path between a local processor and a trusted computing base in a remote processor is compounded for those operating systems which accommodate multiple users. Some examples of prior art multi-user operating systems which have not provided an effective mechanism for establishing a trusted path include UNIX (UNIX is a trademark of AT&T Bell Laboratories), XENIX (XENIX is a trademark of Microsoft Corporation) and AIX (AIX is a trademark of the IBM Corporation). UNIX was developed and is licensed by AT&T as an operating system for a wide range of minicomputers and microcomputers. For more information on the UNIX Operating System, the reader is referred to "UNIX (TM) System, Users Manual, System V," published by Western Electric Company, January 1983. A good overview of the UNIX Operating System is provided by Brian W. Kernighan and Rob Pike in their book entitled "The UNIX Programming Environment," published by Prentice-Hall (1984). A more detailed description of the design of the UNIX Operating System is to be found in a book by Maurice J. Bach, "Design of the UNIX Operating System," published by Prentice-Hall (1986).

AT&T Bell Labs has licensed a number of parties to the use of UNIX Operating System, and there are now several versions available. The most current version from AT&T is Version 5.2. Another version known as the Berkley version of the UNIX Operating System was developed by the University of California at Berkley. Microsoft Corporation has a version known under their trademark as XENIX.

With the announcement of the IBM RT PC (RT PC are trademarks of IBM Corporation), (RISC (reduced instruction set computer) technology personal computer) in 1985, IBM Corporation released a new operating system called AIX which is compatible at the application interface level with AT&T's UNIX Operating System, Version 5.2, and includes extensions to the UNIX Operating System, Version 5.2. For a further description of the AIX Operating System, the reader is referred to "AIX Operating System Technical Reference," published by IBM Corporation, 2nd Edition (September 1986).

The Defense Data Network (DDN) Protocol Handbook, Volume 2, 1985, pages 2-575 to 2-593, (RFC 854 and RFC 855, describes TELNET which is a data communications protocol for distributed data processing systems. The purpose of TELNET Protocol is to provide a fairly general, bi-directional, eight-bit byte oriented communications facility. Its primary goal is to allow a standard method of interfacing terminal devices and terminal-oriented processes to each other. The protocol may also be used for terminal-terminal communication ("linking") and process-process communication (distributed computation). A TELNET connection is a Transmission Control Protocol (TCP) connection used to transmit data with interspersed TELNET control information. The TELNET Protocol includes the principle of a "Network Virtual Terminal" and the principle of negotiated options.

When a TELNET connection is first established, each end is assumed to originate and terminate at a "Network Virtual Terminal", or NVT. An NVT is an imaginary device which provides a standard, network-wide, intermediate representation of a canonical terminal. This eliminates the need for "server" and "user" or "client" hosts to keep information about the characteristics of each other's terminals and terminal handling conventions. All hosts, both client and server, map their local device characteristics and conventions so as to appear to be dealing with an NVT over the network, and each can assume a similar mapping by the other party. The "user" or "client" host is the host to which the physical terminal is normally attached, and the "server" host is the host which is normally providing some service. As an alternate point of view, applicable even in terminal-to-terminal or process-to-process communications, the "user" or "client" host is the host which initiated the communication.

The principle of negotiated options accommodates the fact that many hosts will wish to provide additional services over and above those available within an NVT, and many users will have sophisticated terminals and would like to have elegant, rather than minimal, services. Independent of, but structured within the TELNET Protocol are various "options" that will be sanctioned and may be used with a "DO, DON'T, WILL, WON'T" structure to allow a user and server to agree to use a more elaborate (or perhaps just different) set of conventions for their TELNET connection. Such options could include changing the character set, the echo mode, data security features, etc. The basic strategy for setting up the use of options is to have either party (or both) initiate a request that some option take effect. The other party may then either accept or reject the request. If the request is accepted the option immediately take effect; if it is rejected the associated aspect of the connection remains as specified for an NVT.

Copending U.S. patent application, Ser. No. 149,446, filed Jan. 28, 1988, by Abhai Johri and Gary Luckenbaugh entitled "A Trusted Path Mechanism for An Operating System," assigned to the IBM Corporation, is incorporated herein by reference. The Johri and Luckenbaugh application discloses a trusted path mechanism invention which guarantees that data typed by a user on a terminal keyboard is protected from any intrusion by unauthorized programs in the local data processor to which the terminal is attached. It allows a user to create a non-forgeable and non-penetrable communication path between the user's terminal and the trusted operating system software in the local data processor. The user can create a trusted path by simply pressing a key, called the Secure Attention Key (SAK), on the terminal keyboard. This operation can be called when the user logs into the system in order to be sure that the user is communicating with the real login program and not a Trojan horse program masquerading as a login program, which would steal the user's password. After the user has established the trusted path, he can enter his critical data, such as a password, and can be sure that his password is not being stolen by an intruder's program. Then, after the user logs out, he can be sure that the trusted path has actually logged him out of the system so that a Trojan horse program is not capable of continuing the session started by the user.

The invention described in the Johri and Luckenbaugh application, is contained in a data processing system including a memory to which is connected a plurality of terminals, with at least one terminal including a keyboard having a Secure Attention Key. It is a method in a UNIX-type operating system for creating, in response to the Secure Attention Key, a trusted path between the terminal and a trusted shell portion of a trusted computing base which is a child process of an init process under the operating system. The method includes detecting the Secure Attention Key in a keyboard device driver connected to the keyboard and outputting from the keyboard device driver to a Secure Attention Key Signal Generator, information that the Secure Attention Key has been been detected. It further includes outputting from the Secure Attention Key Generator a SIGSAK signal to all processes operating in a process group of the terminal, terminating all of the processes in the terminal process group. The method further includes applying the SIGSAK signal to access authorization tables associated with all the device drivers interfacing with the terminal, to deny access authorization to all processes in the data processing system except the init process. The method further includes applying the SIGSAK signal to a file access table to remove all addressing information relating to the device drivers interfacing with the terminal, to all processes in the data processing system except the init process. The method further includes executing a fork system call by the init process for a new child process. The method further includes executing an exec system call to overlay a trusted shell process onto the new child process, the trusted shell process having access authorization to the device drivers interfacing with the terminal and the trusted shell process having an addressing relationship defined in the file access table to the device drivers interfacing with the terminal. Thereby a trusted path is established between the terminal and the trusted shell process in the local data processor.

The invention disclosed and claimed herein specifically concerns providing a mechanism for establishing a remote trusted path for communication over TELNET between a local and a remote processor running a multi-user operating system such as UNIX, XENIX, or AIX, so that unauthorized programs are prevented from reading data from the remote processor. None of the prior art multi-user operating systems provides an effective mechanism for establishing a trusted path which prevents unauthorized programs from reading data from a remote processor.

BACKGROUND DISCUSSION OF THE AIX OPERATING SYSTEM

Since the AIX Operating System and other UNIX-like operating systems make use of a specialized set of terms, the following definitions are offered for some of those terms.

Process: A sequence of actions required to produce a desired result, such as an activity within the system begun by entering a command, running a shell program, or being started by another process.

Password: A string of characters that, when entered along with a user identification, allows an operator to sign on to the system.

Operating System: Software that controls the running of programs. In addition, an operating system may provide services such as resource allocation, scheduling, input/output control, and data management.

Kernel: In UNIX-type operating systems, the kernel implements the system call interface.

Init: After the kernel completes the basic process of initialization, it starts a process that is the ancestor of all other processes in the system, called the init process. The init process is a program that controls the state in which the system is running, normally either maintenance mode or multi-user mode.

Getty: The init process runs the getty command for each port to the system. Its primary function is to set the characteristics of the port specified.

Login: The login program logs the user onto the system, validates the user's password, makes the appropriate log entries, sets up the processing environment, and runs the command interpreter that is specified in the password file, usually the shell (SH) program.

Shell (SH): The shell command is a system command interpreter and programming language. It is an ordinary user program that reads commands entered at the keyboard and arranges for their execution.

Fork: The fork system call creates a new process called a child process, which is an exact copy of the calling process (the parent process). The created child process inherits most of the attributes of the parent process.

Exec: The exec system call executes a new program in the calling process. Exec does not create a new program, but it overlays the current program with a new one, which is called the new process image. The new process image file can be an executable binary file, an executable text file that contains a shell procedure, or a file which names an executable binary file or a shell procedure which is to be run.

Signal: Signals provide communication to an active process, forcing a single set of events where the current process environment is saved and a new one is generated. A signal is an event which interrupts the normal execution of a process and can specify a signal handler subroutine which can be called when a signal occurs.

OBJECTS OF THE INVENTION

It is therefore an object of the invention to provide a mechanism for establishing a remote trusted path in a data processing system.

It is still a further object of the invention to provide a mechanism for establishing a remote trusted path over a TELNET network.

It is still a further object of the invention to provide a remote trusted path mechanism for a UNIX ™-type operating system.

SUMMARY OF THE INVENTION

These and other objects, features and advantages of the invention are accomplished by the remote trusted path mechanism for TELNET disclosed herein. In the remote trusted path invention, secure systems may provide a mechanism for the user to establish a trusted path for direct communication with the system's trusted computing base for security-critical operations. This invention allows users to request such a trusted path from remote systems using a new TELNET option and command, in a system-independent, confirmed, backward-compatible manner. It also describes how to implement remote support for such a trusted path in systems which use a Secure Attention Key mechanism such as Secure AIX.

DESCRIPTION OF THE PREFERRED EMBODIMENT

Figure 1:
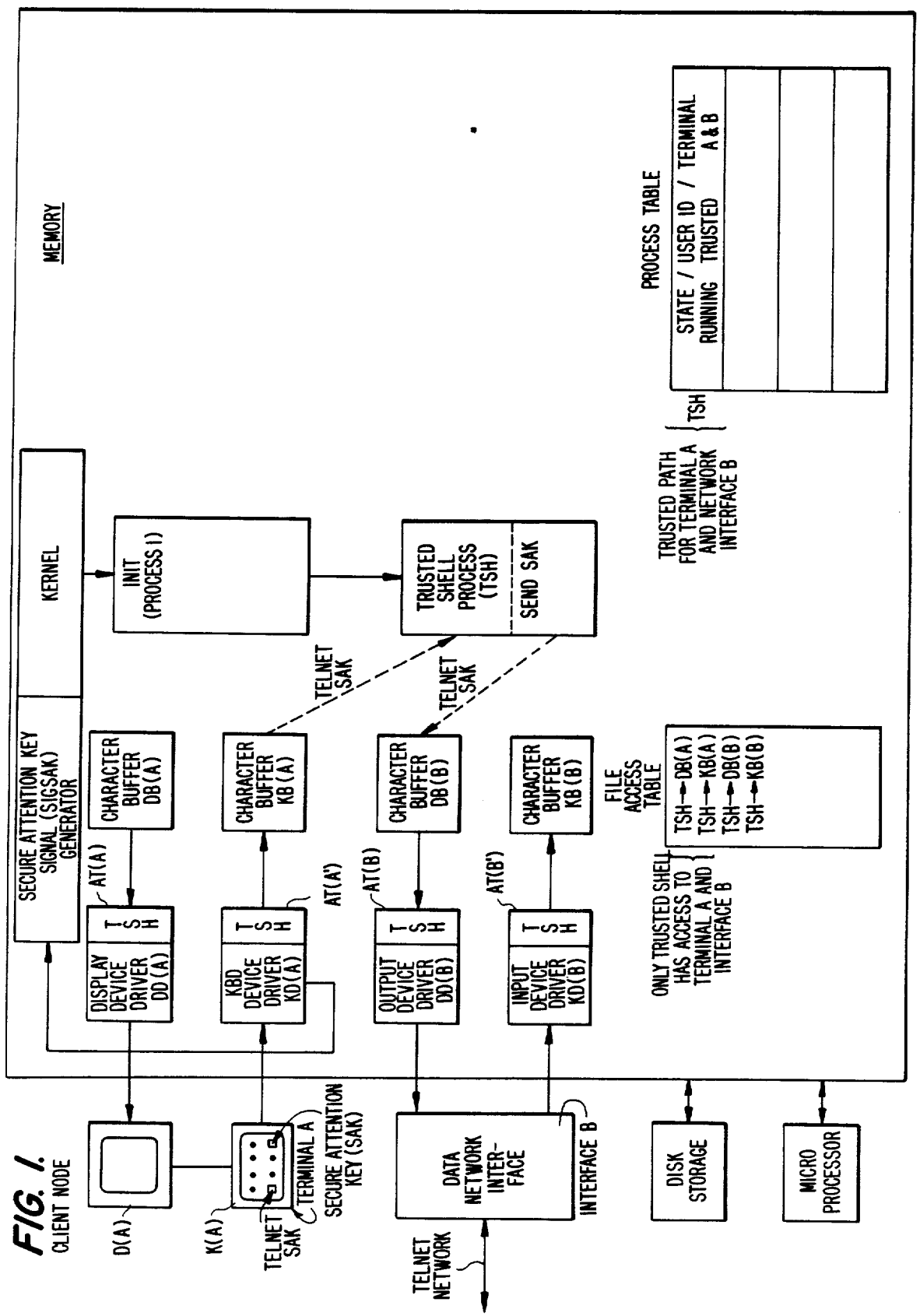
FIG. 1 is a schematic diagram of the client node data processor in a TELNET network, showing the transmission of a TELNET Secure Attention key message.
Figure 5:
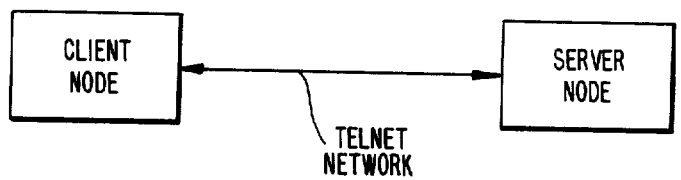
FIG. 5 is a schematic diagram of the TELNET network showing the interconnection of the client data processor and the server data processor.

FIG. 1 is a schematic diagram of a data processor at the client node of a TELNET network shown schematically in FIG. 5. The operation of the client node for establishing a trusted path therein is substantially the same as that which has been described in the copending U.S. patent application by A. Johri, et al., filed Jan. 28, 1988 entitled "A Trusted Path Mechanism for an Operating System," assigned to the IBM Corporation, and incorporated herein by reference. The user at the terminal A presses the Secure Attention Key (SAK) and establishes a trusted shell process TSH, as was previously described in the Johri, et al. patent application.

The SAK is interpreted by driver KD(A) which signals the SIGSAK generator to issue a SIGSAK signal. In response to this, the Trusted Shell Process TSH is established under the parent INIT process and TSH becomes the only process authorized to access drivers DD(A) and KD(A) for terminal A and drivers DD(B) and KD(B) for data network interface B. All other processes in the process groups for the terminal A and the interface B are terminated. In accordance with the present invention, the terminal A further includes a TELNET Secure Attention Key which can be either a command followed by an argument, such as "send (SAK)" or alternately it can be a character sequence which is initiated by the depression of one or more keys on the keyboard. In either case, the TELNET SAK signal is sent through the device driver KD(A), to the trusted shell process TSH. The trusted shell process TSH in FIG. 1 includes as one of its component processes or commands, a "send SAK" process, which forwards the TELNET SAK signal through the buffer DB(B) and the output driver DD(B) to the data network interface B. The data network interface B is connected to the TELNET network and forwards the TELNET SAK message over the network to the server node.

Figure 2:
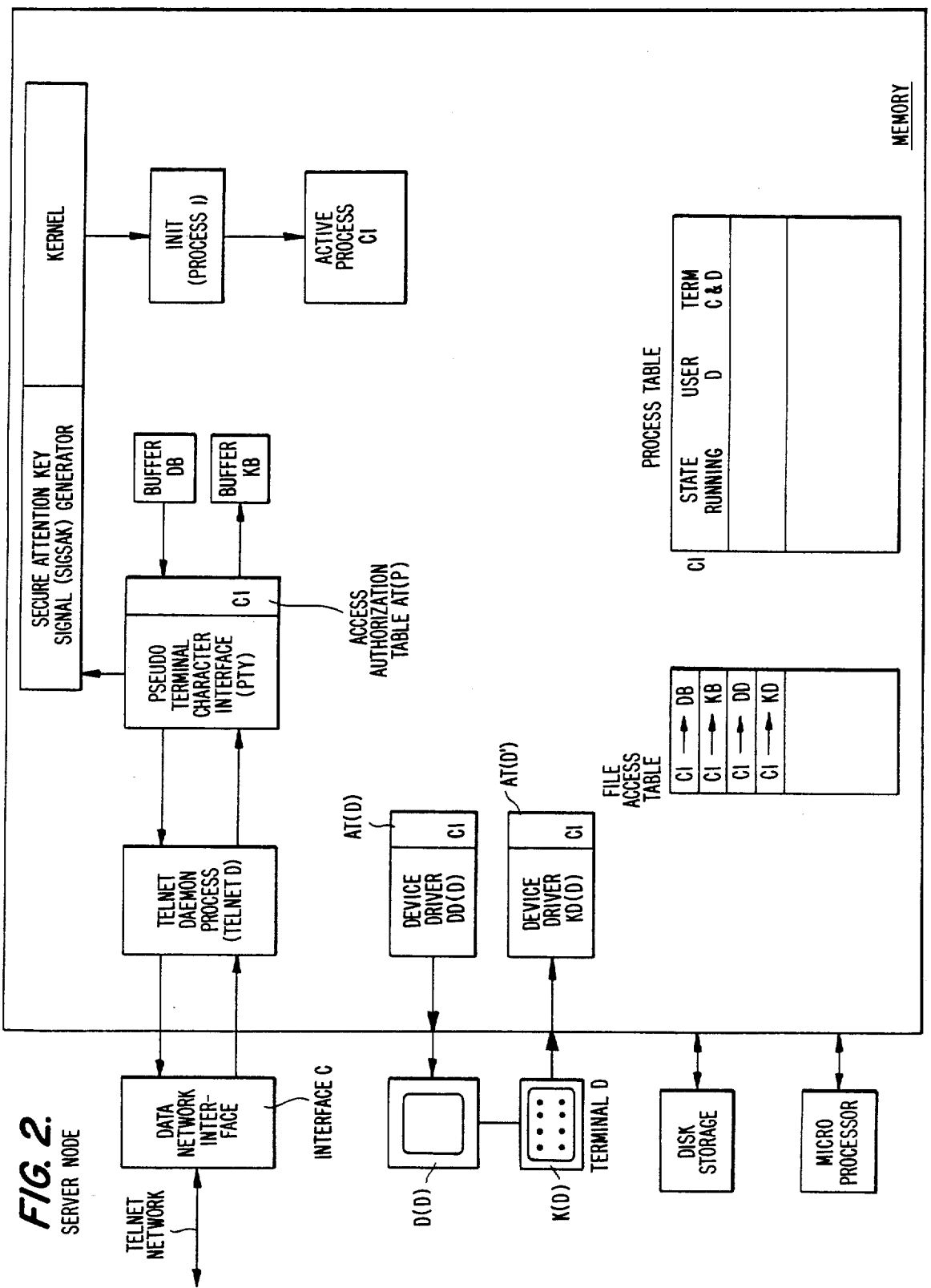
FIG. 2 is a schematic diagram of a server node data processor during an initial state where no trusted path is established.

FIG. 2 shows a schematic diagram of a data processor at the server node in an initial state when it is running an untrusted active process C1. The data processor of FIG. 2 has a data network interface C which is connected to the TELNET network and sends and receives messages over the TELNET network using the TELNET transmission control protocol. The interface C inputs data to and receives data from a TELNET daemon process referred to herein as telnetd. The operating system for the data processor at the server node of FIG. 2 is a UNIX-like operating system, which includes provision for daemon processes. A daemon process is one that is begun by the kernel or the root shell and can only be stopped by the superuser of the UNIX system. Daemon processes generally provide services that must be available at all times such as sending or receiving data from I/O devices. The reader can refer to one of the previously cited UNIX or AIX references for further discussion of the daemon process and other features of UNIX-like operating systems. The TELNET daemon process of FIG. 2 serves to interface between the data network interface C and a pseudo-tty is an abbreviation for "teletype" terminal character interface PTY in FIG. 2. The interface PTY is similar to a device driver and serves the purpose of converting the format of the data transferred through telnetd into a format characteristic of a terminal which could be connected to the server node, such as the terminal D shown in FIG. 2. The interface PTY has an access authorization table AT(P) associated with it which stores the identity of processes running in the server data processor which are authorized to access the interface PTY. The interface PTY outputs character data to the buffer KB and receives character data from the buffer DB. The file access table in the server node 2 establishes an addressing cross-reference table to enable processes such as the process C1 to exchange data with the interface PTY and the device drivers AT(D) and AT(D'). The process table in the server node maintains the status of the processes in the server node, such as the active process C1. In the example initial state depicted in FIG. 2, the active process C1 serves to enable communication between the TELNET network interface C and the terminal D for a particular application.

Figure 3:
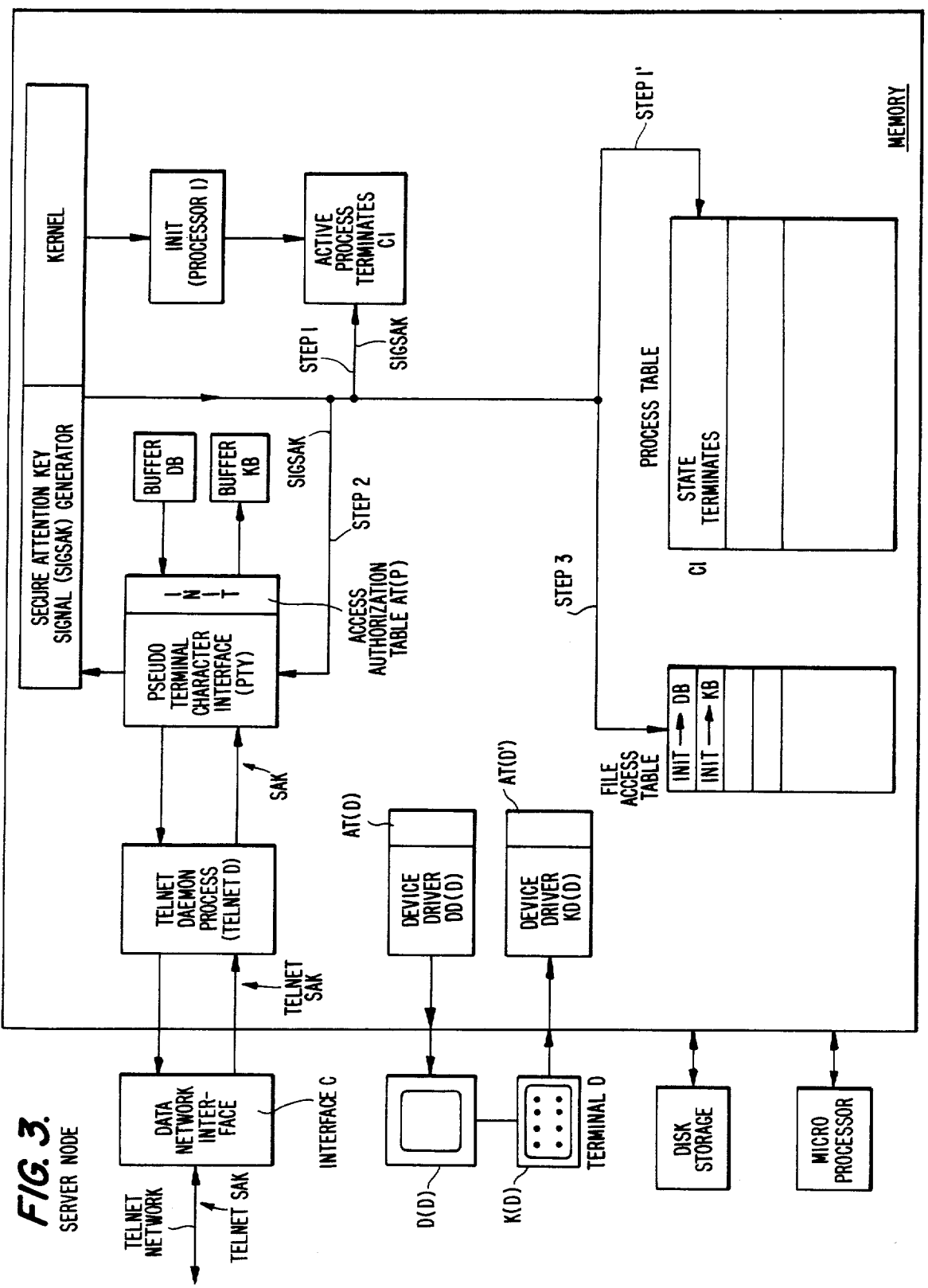
FIG. 3 is a schematic diagram of the server node data processor of FIG. 2, wherein the TELNET Secure Attention Key message has just been received from the TELNET network.

In FIG. 3, the TELNET SAK message which was transmitted from the client node processor as was depicted in FIG. 1, is shown to be received at the data network interface C of the server node in FIG. 3. The TELNET SAK message is transferred to the TELNET daemon process which outputs in response thereto a Secure Attention Key SAK message to the interface PTY. In a manner similar to that described for the device driver KD(A) in the Johri, et al. patent application, the interface PTY responds to the receipt of the SAK by outputting a signal to the Secure Attention Key signal (SIGSAK) generator in FIG. 3. The Secure Attention Key signal generator is similar to that which was described in the Johri, et al. patent application. The Secure Attention Key signal generator then outputs a SIGSAK signal which has an effect similar to that which was described in the Johri, et al. patent application. In a first step, the SIGSAK signal terminates the active process C1 and also alters the status of the process C1 in the process table. The SIGSAK signal also changes the access authorization in the table associated with the interface PTY in a second step so that only the init parent process is authorized to have access to the interface PTY. In a third step, the SIGSAK signal causes the file access table to remove all address translation information to the interface PTY so that only the init parent process is capable of accessing the interface PTY.

Figure 4:
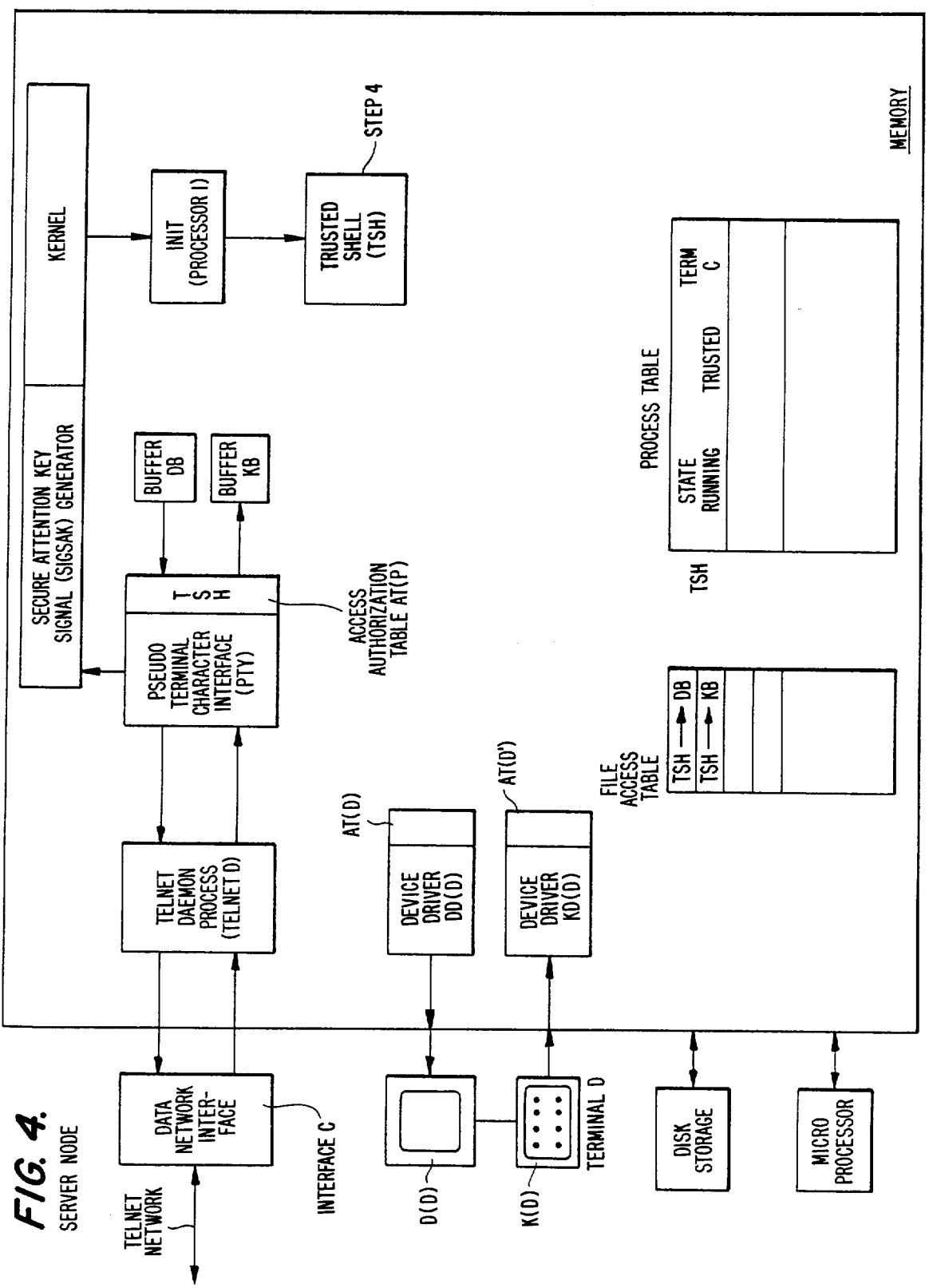
FIG. 4 is a schematic diagram of the server node data processor of FIG. 3, after the establishment of a trusted path from the TELNET network to the trusted shell.

In FIG. 4, the server node data processor continues with the operation of establishing a trusted path in response to the receipt of the TELNET SAK, by having the init process go through a sequence of UNIX-like operations which result in the production of the trusted shell TSH in step 4, in a manner similar to that described for the production of the trusted shell in the Johri, et al. patent application. The interface PTY has its access authorization table modified so that the trusted shell now is the sole communicator with the interface PTY and the file access table is modified so that the trusted shell is the only process that has entries in the table for address translation to the interface PTY. The process table is modified so that the trusted shell is in the running state and is noted as being a trusted process which is authorized to communicate through the data network interface C to the TELNET network.

In this manner, a trusted path is established between the client node, over the TELNET network to the trusted shell in the server node.

Figure 6:
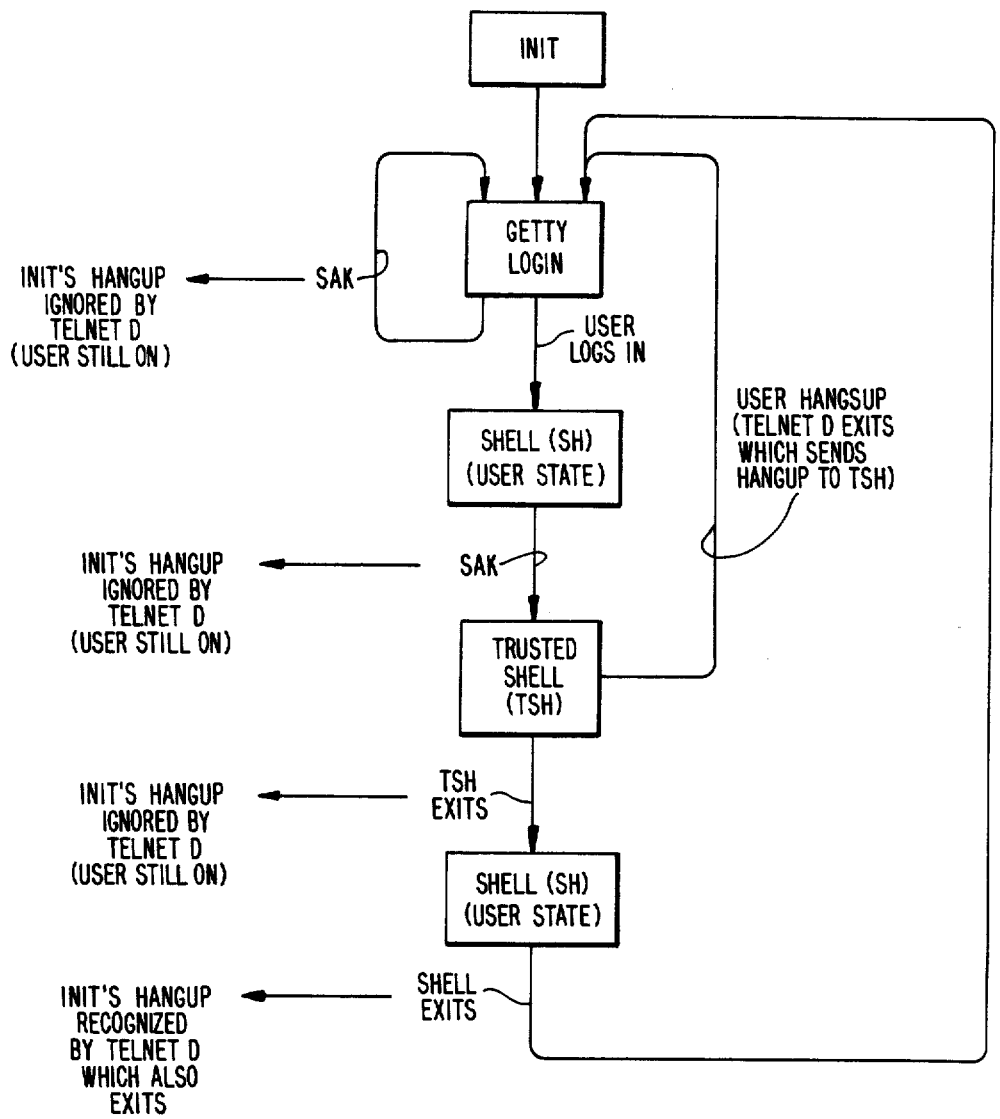
FIG. 6 is a state diagram of the response of the processes in the server node to the TELNET Secure Attention Key message.

FIG. 6 shows a state diagram of how the init parent process spawns its child processes in the course of establishing a trusted path, in response to the receipt of TELNET SAK messages over the TELNET network. As was described in the Johri, et al. patent application, the init process is the parent process in a UNIX-like operating system, which is capable of spawning child processes by the fork system call followed by an exec system call. When the init process spawns as its child process a getty process, the getty command performs its primary function of setting the characteristics of a specified port, for example the port for the TELNET network interface C. The getty process typically includes a login process which logs the user onto the system, validates the user's password and will then usually run an untrusted shell program SH. As is shown in the state diagram of FIG. 6, if a TELNET SAK signal is received while either the getty or the login processes are active, the getty or login process will terminate, the init process will generate a hangup signal called vhangup and will then spawn another getty process. The vhangup issued in this circumstance should be ignored by the TELNET daemon and the TELNET daemon should stay active.

In FIG. 6, during the period when the shell SH is active, if a TELNET SAK is received, this normally indicates that the user at the client processor node wishes to establish a remote trusted path in the server node and thus the sequence of transitional processes described in the Johri, et al. patent application take place, resulting in the termination of the shell SH and the establishment of the trusted shell TSH. When the shell SH is terminated, the init process will issue a vhangup signal which must be ignored by the TELNET daemon process. All other processes in the terminal process group associated with the network interface C are terminated when the trusted shell TSH is established During the interval that the trusted shell TSH is active in the server node, corresponding to FIG. 4, there is a trusted path which runs from the user's terminal A at the client node, through the client node data processor, over the TELNET network, into the network interface C at the server node and through the server node data processor to the trusted shell therein, where secure operations may be executed. When a normal exit from the trusted shell TSH takes place, the untrusted shell SH will then become the active process, as was described in the Johri, et al. patent application. During the termination of the trusted shell TSH, the init process will issue a vhangup signal which once again must be ignored by the TELNET daemon process. However, if the user at the remote client processor hangs up, this condition will be transmitted over the TELNET network and when received by the TELNET daemon, must initiate a true termination of the trusted path, thus the init process will spawn a new getty process, thereby denying any surreptitious use of the residual trusted path after the user has hung up. This is depicted in the state diagram of FIG. 6.

Thus it is seen that a remote trusted path can be established by the invention disclosed herein, in an improved manner.

A MORE DETAILED DESCRIPTION OF THE INVENTION

Establishing a trusted path to a remote system

The TELNET SAK command allows us to establish a trusted path to remote systems which support it. It does this by sending the TELNET SAK (Secure Attention Key) command. This is a system-independent request for the remote TELNET server to do whatever is necessary to establish a trusted path on behalf of the client. In the case where the remote system is Secure AIX, the remote server simply "types" the actual Secure Attention Key sequence to the pseudo-tty. As usual, this will either cause the remote login prompt to be repeated (if issued before we have logged in to the remote system), or the trusted shell to be started up in place of the remote login shell.

When TELNET opens a connection to a remote system, it asks the remote server if it supports the TELNET SAK command by sending IAC DO TELOPT_SAK. If the server responds IAC WILL TELOPT_SAK, TELNET enables the user interface for sending the SAK command. Subsequently we can make TELNET send SAK by entering TELNET command mode (normally by typing "esc ]") and entering the command TELNET: send SAK in response to the TELNET's prompt. If the remote side supports SAK, it will then establish the trusted path; otherwise TELNET will respond Remote side does not support SAK.

To establish a trusted path on the local system while using TELNET, type the local Secure Attention Key sequence as usual. If we are using a device which does not support multiple virtual displays (that is, a terminal and not the console), it is advisable to exit the TELNET session first, as otherwise TELNET will be killed when it is replaced by the trusted shell, and the remote login session will then also be closed abruptly.

Figure 7:
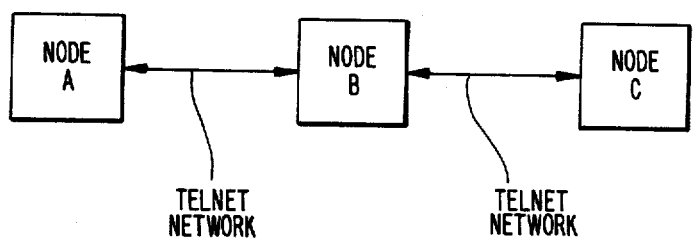
FIG. 7 is a schematic diagram of a "daisy chain" of three data processor nodes interconnected in a TELNET network.

A complication arises if we have used several invocations of TELNET to connect to several systems in a chain; as in FIG. 7. In this situation, how do you establish a trusted path on C from A? To answer this, note that each invocation of TELNET only communicates directly with its immediate neighbor. To establish a trusted path on C in FIG. 7, we must have the TELNET program on B send the TELNET SAK command. In order to do this, we must be able to enter TELNET command mode on B, which means w must have different TELNET escape characters on A and B. In this case, if both TELNETs are currently using the default "esc ]" escape character, we must first change the escape character on A by typing, for example:

| | |
|---|---|
| esc ] | (escape to TELNET on A) |
| TELNET: set escape T | (TELNET on A) |
| Escape character is T | (TELNET on A) |
| esc ] | (escape to TELNET on B) |
| TELNET: send SAK | (TELNET on B) |
| Type ? for a TSH command menu | (TSH on C) |
| TSH# | (TSH on C) |

As an aside, in this situation it is again not advisable to send the TELNET SAK command from A to B without first exiting the TELNET connection from B to C, since starting the trusted shall on B will kill the TELNET session on B, causing the login session on C to terminate. This is true no matter what type of device we are using on A, since on B we are using the pseudo-tty device which does not support multiple virtual displays.

TELNET allows access to a system over the network and presents that system to the user as if the user were accessing it locally. To invoke the Secure Attention Key, TELNET and its components must be extended to process it.

A new TELNET option is added to the TELNET protocol. In the notation of the above referenced DDN Protocol Handbook RFC 854 the TELNET Secure Attention Key is handled as follows:

(a) The option SAK is defined (with value 254, for example.).

(b) IAC WILL SAK is the user request for Secure Attention Key support.

(c) IAC SAK is the sequence when the Secure Attention Key is sent.

For TELNET a generic Secure Attention Key is defined in order to be independent of the environment where TELNET is executed. The key can be [standard TELNET escape characters] Z.

When the TELNET server receives the Secure Attention Key, it passes it directly to the line driver, so that the local Secure Attention Key functionality is invoked.

NAME: TELNET - user interface to TELNET protocol

DESCRIPTION:

TELNET is used to communicate with another host using the TELNET protocol. If TELNET is invoked without host or post arguments, it enters command mode, indicated by its prompt ("TELNET:"). In this mode, it accepts and executes the commands listed below.

When TELNET first establishes a connection to a remote host, it attempts to negotiate several TELNET options with the remote server.

The first of these is the type of input mode, either "character at a time" (the preferred mode for AIX) or "line by line."

The second option negotiated is the terminal type.

The third option negotiated is support for the TELNET Secure Attention Key (SAK). If the remote side supports it, TELNET will enable the "send SAK" command for sending TELNET SAK to the remote system for establishing a trusted path.

While connected to a remote host, TELNET command mode may be entered by typing the TELNET "escape character".

The TELNET command may also be accessed as "tn".

Commands:

The following commands are available:

| The following commands are available: | |
|---|---|
| open host [port] | Open a connection to the named host. |
| close | Close a TELNET session and return to command mode. |
| quit | Close any TELNET session and exit TELNET. |
| z | Start a subshell on the local system. |
| send argument | Sends one or more special character sequences to the remote host. The following are the arguments which may be specified: |
| escape | Sends the current TELNET escape character. |
| SAK | Sends the TELNET SAK (Secure Attention Key) sequence, which should cause the |

-continued

| The following commands are available: | |
|---|---|
| | remote system to establish a trusted path for direct communication with its trusted computing base. If the remote system is a Secure AIX system, it will send the actual Secure Attention Key to the pseudo-tty. As part of the assurance needed for the trusted path, TELNET will not send SAK, and will print the error message "Remote side does not support SAK" if the remote system did not respond positively when TELNET inquired about SAK support. |
| synch | Sends the TELNET SYNCH sequence. This sequence causes the remote system to discard all previously typed (but not yet read) input. |
| brk | Sends the TELNET BRK (Break) sequence, which may have significance to the remote system. |
| ip | Sends the TELNET IP (Interrupt Process) sequence, which should cause the remote system to abort the currently running process. |
| ao | Sends the TELNET AO (Abort Output) sequence, which should cause the remote system to flush all output from the remote system to the user's terminal. |
| ayt | Sends TELNET AYT (Are You There) sequence, to which the remote system may or may not choose to respond. |
| ec | Sends the TELNET EC (Erase Character) sequence, which should cause the remote system to erase the last character entered. |
| el | Sends the TELNET EL (Erase Line) sequence, which should cause the remote system to erase the line currently being entered. |
| ga | Sends the TELNET GA (Go Ahead) sequence. |
| nop | Sends the TELNET NOP (No Operation) sequence. |

NAME: telnetd-TELNET protocol server.
DESCRIPTION:
  Telnetd is a UNIX-type daemon process, a server which supports the DARPA standard TELNET virtual terminal protocol.

Telnetd operates by searching for an available pseudo-terminal device which has been enabled for login.

Telnetd opens and manipulates the master side of the pseudo-terminal, implementing the TELNET protocol and passing characters between the remote client and the login process which is presumably running on the slave side of the pseudo-terminal.

When a TELNET session is started up, telnetd sends TELNET options to the client side indicating a willingness to do remote echo of characters, to suppress go ahead, to receive terminal type information from the remote client, and (on Secure AIX systems) to process TELNET SAK (the Secure Attention Key).

If the remote client is willing, telnetd requests its terminal type. On receiving it, telnetd attempts to translate it to AIX standard form, and checks if the indicated type is supported on the system by seeing if there is a compiled terminfo entry for it. If not, it again requests a terminal type. This terminal type "negotiation" continues until the remote client sends an acceptable type, or it sends the same type twice in a row (indicating it has no other types available).

If the remote client sends the TELNET SAK command, telnetd "plays" the local Secure Attention Key characters to the pseudo-tty. This causes the invocation of the trusted path on the slave side of the pseudo-tty, resulting in either a repeat of the login prompt, or the starting of the trusted shell tsh. Telnetd does not require the remote client to request SAK support before using it, though the client should do so from an assurance standpoint.

The following is an annotated pseudocode description of the trusted path mechanism for TELNET for telnetd and init code. In particular, the implementation on the remote side presupposes support for the trusted path (SAK) in the line discipline and init as described in the above referenced, copending patent application to Johri, et al, entitled "Trusted Path Mechanism for Operating System".

This annotated pseudocode summarizes the significant portions of the TELNET client and server, and init, to support both ends of the trusted path for TELNET under Secure AIX.

TELNET client (user-level program, TELNET):

The first is the client's request for trusted path support, and the monitoring of the server's reply. This option negotiation is necessary to establish that sending the TELNET SAK command will in fact create a trusted path on the remote system.

```
on connection, send IAC DO TELOP_SAK(200).
if receive IAC WILL TELOPT_SAK,
        enable the send SAK command
else if receive IAC WONT TELOPT_SAK or nothing,
        leave send SAK disabled.
```

The second is the user-level interface to sending the TELNET SAK command itself. The user may send the command at any time while connected to a remote system, either before or after login.

When the user types "esc ]" (TELNET command escape character) send SAK

```
if enabled,
    send IAC SAK(200)
else
    tell the user "remote side does not support SAK."
TELNET server (remote program, telnetd):
```

The first change is the server's offer to support the trusted path. This is actually sent without prompting by the client.

on connection, send IAC WILL TELOPT_SAK
    This is the server's support for the TELNET SAK command itself. The complicating factor here is that, as part of the assurance needed for the trusted path, all the processes running on the slave side of the pty will be killed by SIG-SAK, and init will issue a hangup call on the pty. This means the server telnetd will receive a SIGHUP hangup indication, and must ignore it. Init similarly issues a hangup after the trusted shell dies (which, since it can have an arbitrary cause, cannot be predicted by telnetd). Hence in this case, telnetd must expect and ignore a second hangup indication.

```
set expected hangups = 0
if receive IAC SAK,
    note the state of the login session on the slave side
    of the pty by reading /etc/utmp.
```

```
if the state is USER_PROCESS or TSH_PROCESS,
    set expected hangups = 2
else
    set expected hangups = 1
flush the pty input queue
send the local Secure Attention Key sequence
(currently TX for AIX) to the pty.
if receive a hangup from the pty
    if expected hangups ] 0
        decrement the number of expected hangups
        return to normal processing
    else
        shutdown the connections and exit
```

INIT features:

The first feature is that init should not start up the trusted shell if the master side of the pty (e.g. telnetd) has exited. This would happen if, for example, the login shell was killed directly by kill command, for then telnetd would not be expecting the resulting hangup.

```
if a user's shell (USER_PROCESS) running on a pty has died
from SIGSAK
    if the master side of the pty is still open
        start the trusted shell tsh
    else
        start a new getty process
```

The second feature is that init should not restart the login shell after the trusted shell if the user hung up on the TELNET session (using the "close" command in TELNET) to exit the trusted shell.

```
if the cause of death was abnormal, such as by hangup
(SIGHUP)
    start a new getty process
else
    start the user's login shell
```

Although a specific embodiment of the invention has been disclosed, it will be understood by those having skill in the art that changes can be made to the details of the specific embodiment without departing from the spirit and the scope of the invention.

What is claimed is:

1. A method in a computer operating system for creating, in response to a network secure attention request, a trusted path between a communications network connected to a data processor running a trusted control process under said operating system and a trusted user program portion of a trusted computing base in said data processor, comprising the steps of:

waiting for the receipt of a network Secure Attention Key message from said communications network;

outputting in response to the receipt of said network Secure Attention Key message, a Secure Attention Key signal;

terminating active processes under a trusted parent control process in response to said production of said Secure Attention Key signal;

limiting the access of processes in said data processor to said communications network to only said control process;

establishing a trusted user program process under said control process, having exclusive access to said communications network;

whereby a trusted path is established between said communications network and said trusted user program process.

2. In a data processing network including a first node having a first data processor connected over a data communications network to a second node having a second data processor, said first data processor having connected thereto a terminal which includes a local Secure Attention Key means and a network Secure Attention Key means, a method for establishing a trusted path from said terminal through said first data processor and over said network to a trusted process in said second data processor comprising the steps of:

establishing a first trusted process in said first data processor in response to a first Secure Attention Key signal from said local Secure Attention Key means, said first trusted process having a trusted path to said terminal;

establishing a communications link between said terminal and said data processing network with said first trusted process, and outputting a network Secure Attention Key message over said network to said second data processor in response to a signal from said network Secure Attention Key means;

receiving said network Secure Attention Key message in said second data processor and in response thereto, outputting a second Secure Attention Key signal;

terminating active processes under a parent control process in said second data processor in response to said second Secure Attention Key signal;

limiting the access of processes in said second data processor to said communications network to only said control process;

establishing a second trusted process in said second data processor under said control process, having exclusive access to said communications network;

whereby a trusted path is established from said terminal through said first processor and over said communications network and through said second processor to said second trusted process.

* * * * *